(No Model.)

B. WALTON.
STOCK BARN.

No. 288,896. Patented Nov. 20, 1883.

WITNESSES:
Fred. G. Dieterich
A. G. Syne

INVENTOR:
Benj. Walton
BY Munn & Co.
ATTORNEYS.

UNITED STATES PATENT OFFICE.

BENJAMIN WALTON, OF FAIRBURY, ILLINOIS.

STOCK-BARN.

SPECIFICATION forming part of Letters Patent No. 288,896, dated November 20, 1883.

Application filed February 19, 1883. (No model.)

*To all whom it may concern:*

Be it known that I, BENJAMIN WALTON, of Fairbury, in the county of Livingston and State of Illinois, have invented a new and useful Improvement in Stock-Barns, of which the following is a full, clear, and exact description, reference being had to the annexed drawings, forming part of this specification.

The object of this invention is to provide a stock-barn which shall be adapted to answer the purpose of the ordinary stock-yards.

Figure 1:
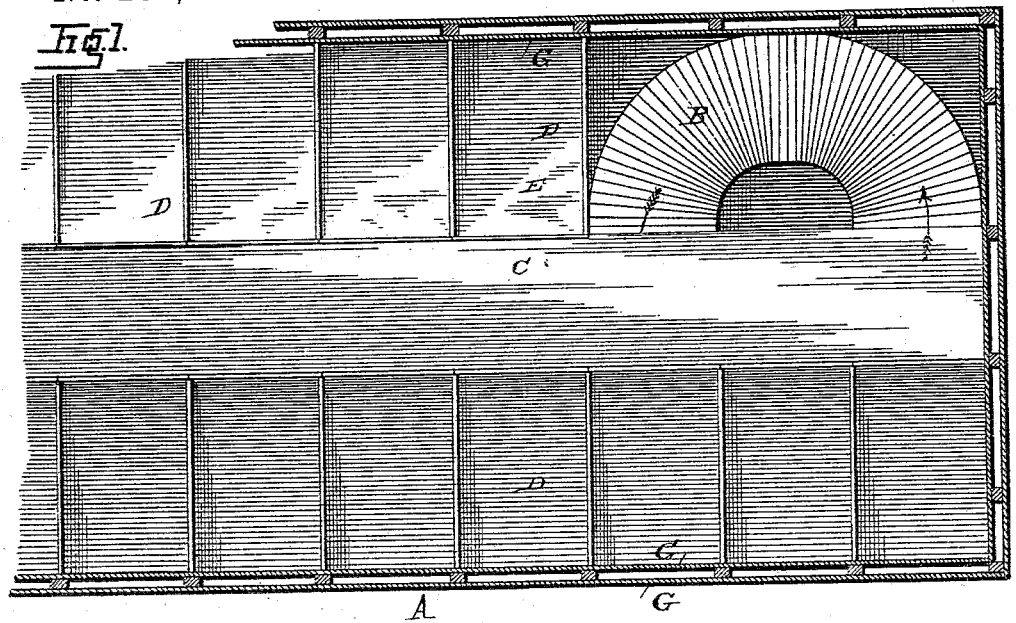
Figure 2:
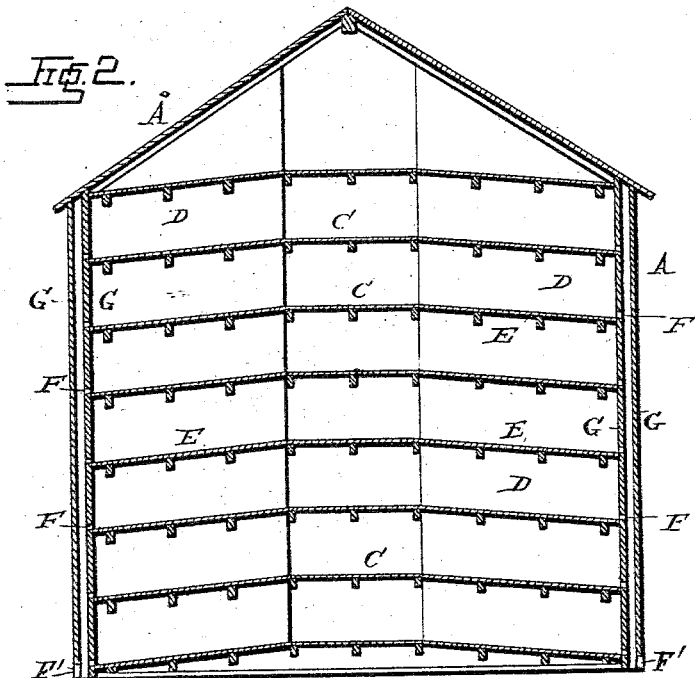

In the drawings, Figure 1 is a plan view of part of one of the stories of the building, and Fig. 2 is a transverse section of the building.

A indicates an oblong building, having an inclined stairway or floor, B, at either end, leading from one story to another. The stairway is spiral in form, and communicates with the central longitudinal driveways, C, which form landings between the top and bottom of the stairs. On each side of the central driveways, C, is a series of pens or compartments, D, which are designed to be of suitable size for a car-load of stock. The compartments communicate with the driveways, and have tight floors E, which are inclined slightly downward from the driveways to openings F in the inner one of the double side walls, G, to allow the offal to be discharged from the floors through said openings, and down between the walls, and out through openings F' to the outside of the building. The outer walls prevent cold air from entering at the openings, and serve to obscure the soiled inner walls.

By the use of stock-pens of the above construction, not only can much land be saved which is now used for extensive stock-yards, but stock can be unloaded and kept in dry pens conveniently located to save long drives, and for extensive slaughter-houses it would be of great value also to use such pens. The pens can be easily kept clean of mud and offal, and the stock will be protected from the weather and from danger of being driven off by thieves.

I am aware that it is not broadly new to provide stables or barns with elevated floors which are reached by inclined planes, and which have stalls for feeding and sheltering animals and outlets in the walls for discharging offal. I am also aware that houses have been made with double walls having passages between them, and I therefore do not claim these features, broadly. In my invention, however, the construction of the passage-ways and pens is specially adapted to the handling of large masses of cattle, hogs, &c., a free ventilation being afforded from the passage-ways and stairways, while the offal is capable of being removed expeditiously from any height without soiling the outer walls of the building, and thereby rendering them unsightly. Where simply an outlet is formed through the wall of the building for discharging offal, as has heretofore been done, it is evident that a large building suitable for a stock-yard would soon become so much disfigured as to be a nuisance. The double walls having passages communicating with the several floors and discharging outwardly at the ground is an important feature, therefore, in my invention, and, so far as I am aware, it is entirely new.

What I claim is—

A stock-barn having double walls G, with openings F in the inner walls, and openings F' leading through the outer walls at their base, the central passage-ways, C, and the series of pens D, having inclined floors E, leading from opposite sides of the passage-ways to the openings F, substantially as shown and described, and for the purpose set forth.

BENJAMIN WALTON.

Witnesses:
JOHN J. TAYLOR,
J. D. WEAVER.